June 25, 1968  L. STÖBE  3,389,802
TANK FILTER WITH INTERCHANGEABLE CLAMPING PLATES
Filed March 27, 1967  2 Sheets-Sheet 2

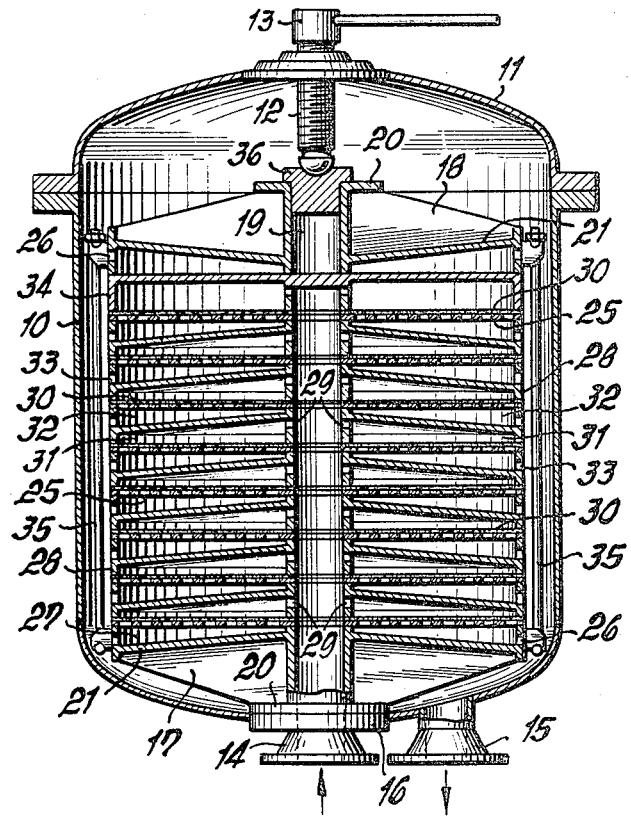
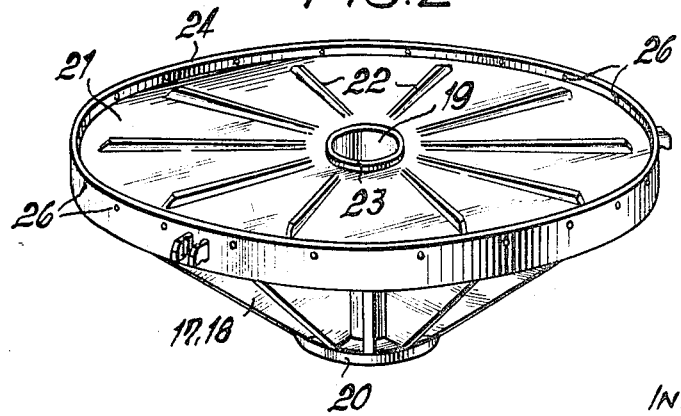

INVENTOR
Lothar STÖBE 3,389,802
TANK FILTER WITH INTERCHANGEABLE
CLAMPING PLATES
Lothar Stöbe, Bad Kreuznach, Germany, assignor to
Seitz-Werke G.m.b.H., Bad Kreuznach, Germany
Filed Mar. 27, 1967, Ser. No. 626,217
4 Claims. (Cl. 210—232)

ABSTRACT OF THE DISCLOSURE

A tank filter with a central inlet for the liquid to be filtered and with a filter packet composed of a plurality of filter plates with filter layers therebetween, in which said filter packet is adapted to be clamped together by two clamping plates which are identical as to height, diameter, and outer shape and are each provided with a central bore for alignment with the inlet passage for the fluid to be filtered, that surface of each of said clamping plates which faces the filter packet being provided with elevations for resting a filter thereon and also adapted to form a filter chamber therewith.

The present invention relates to a tank filter with a central inlet for the cloudy liquid and with a filter packet composed of a plurality of filter plates with interposed filter layers, said filter plates being confined by oppositely located clamping plates and being adapted to be compressed by means of a threaded spindle journalled in the cover or lid of the filter tank.

With filtering devices of the above mentioned type, in which the filter tank is in most instances in upright position and in which the filter packet is in customary manner from time to time by means of a block and tackle pulled out of and inserted into the filter tank, the two clamping plates which confine the filter packet are of different design. More particularly, only the lower clamping plate is provided with the necessary connection for the central liquid inlet. If with this heretofore known design it becomes necessary to take the filter packet apart for purposes of cleaning the filter plates and for replacing the exhausted filter layers, it will be necessary first separately to pile up or stack the cleaned filter plates removed from the packet until the lower clamping plate which contains the connection to the central liquid inlet of the filter tank is freed. Only then can the filter packet be composed again to which end the previously separately placed filter plates must be placed upon the last freed lower clamping plate and must again be piled one upon the other.

The present invention is based on the idea that the amount of work and the time spent for the intermediate stacking of the filter plates can be avoided when both clamping plates are selectively usable as upper and lower plate and the filter packet can be stacked on either one of said plates. In an effort to realize this saving in time and labor, according to the present invention, both clamping plates are as to their height, diameter and shape identical and are each provided with a central bore in conformity with the central inlet passage for the cloudy liquid, said central bore being provided with a sealing flange adapted to the central bottom flange of the filter tank. That surface of said clamping plates which faces the filter packet is provided with elevations, for resting thereon a filter screen which together with the surface of the respective lowermost clamping plate of the filter packet forms a filtrate chamber provided with openings.

According to a further development of the invention, between the upper clamping plate and the respective adjacent filter plate of the filter packet there is inserted a member forming a chamber which communicates with the central inlet passage and closes the same while serving as cloudy liquid receiving chamber for the adjacent filter plate. According to a still further feature of the invention, a pressure member adapted to absorb the pressure of the threaded spindle is inserted into the central bore of the upper clamping plate.

The invention is illustrated by way of example in the accompanying drawings, in which:

FIG. 1 is an axial section through a tank filter according to the invention with inserted filter packet.

FIG. 2 is a perspective view of a clamping plate according to the invention.

Figure 3:
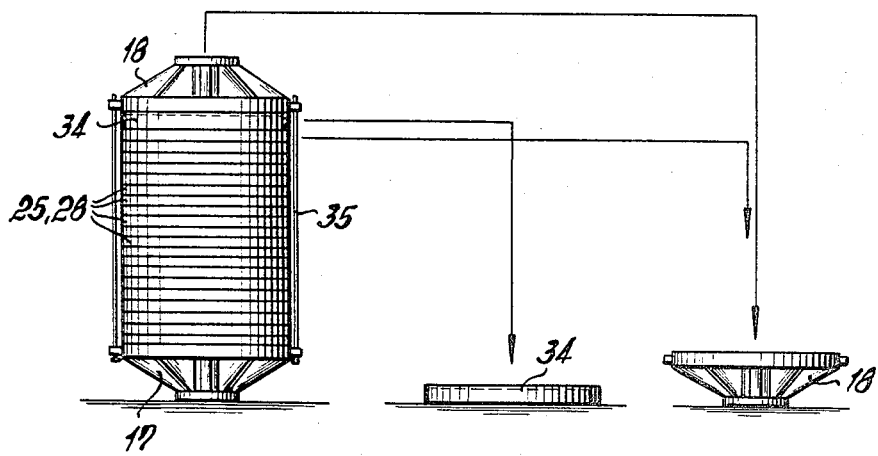
FIGS. 3 and 4 illustrate the stacking and restacking of the filter packet in simplified sequence.

Referring now to the drawings in detail, the filtering device illustrated in FIG. 1 comprises primarily a tank 10 with a cover 11 mounted thereon in a liquid-tight manner. Arranged within said tank is a filter packet. A threaded spindle 12 which extends into the interior of the tank is rotatably journalled in cover 11. At the free end of said spindle 12 there is provided a handle 13.

The tank bottom has a central inlet connection 14 for the cloudy liquid and an outlet connection 15 for the filtrate. Said inlet connection 14 is in the center of said bottom and is provided with a flange 16. The outlet connection 15 is laterally offset with regard to the inlet connection 14.

The filter packet resting on said flange 16 comprises lower and upper clamping plates 17 and 18 respectively and a plurality of interposed filter plates. As will be seen from FIG. 2, both clamping plates 17 and 18 are each provided with a central bore 19 while that side of said clamping plates which faces away from the filter packet is provided with a flange 20. The bore 19 and the flange 20 pertain to the liquid inlet connection 14 and are adapted to the bottom flange 16. The surface 21 of the plates 17 and 18 which is inclined with regard to the packet has a plurality of radial elevations 22, a circular rim 23 surrounding bore 19, and an outer rim 24 for supporting a screen plate 25. The screen plate or screen 25 together with the plate surface 21 forms a filter chamber 27 having outer peripheral bores or openings 26 provided in the rim 24 and communicating with the annular chamber formed by the filter tank 10 and the outer periphery of plates 17 and 18 and of the filter plates and screens therebetween.

With regard to the outer shape, the height and the diameter as well as the dimensions of the bore 19 and the flange 20, both plates 17 and 18 are identical. Each of the filter plates comprises a supporting plate 28 and a screen plate 25 associated therewith, said plates 28 and 25 are set one upon the other. Each supporting plate 28 has inner peripheral bores or openings 29 communicating with the liquid inlet connection 14 and also has outer peripheral bores 33 communicating with the annular chamber formed by tank 10 and the outer periphery of plates 17 and 18 and of the filter plates and screens. Each supporting plate 28 together with the respective screen plate 25 mounted thereon and pertaining to the adjacent supporting plate 28 and with an interposed filter layer 30 forms a chamber 31 for the cloudy liquid. The annular chamber 32 forms a filtrate chamber. The additionally provided screen plate 25 arranged between the lower clamping plate 17 and the adjacent supporting plate 28 forms with its filter layer 30 a further filter element. By means of an annular chamber 34 which serves as cloudy liquid receiving chamber and closes the inlet connection 14 in upward direction there is formed a further filter element at the upper clamping plate 18. The entire filter packet is held together with a plurality of tierods or screws 35 which engage the circumference of the clamping plates 17 and 18. In the central bore 19 of the upper clamping plate 18 there is detachably inserted a pressure member 36 adapted to absorb the pressure exerted by the threaded spindle 12.

Figure 4:
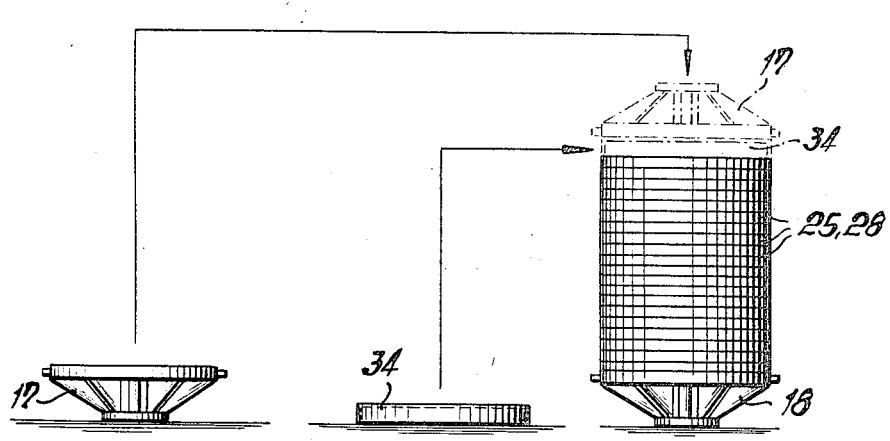

The cleaning of the individual elements of the filter packet while simultaneously replacing the exhausted filter layers 30 is customarily effected outside the filter tank at a station which is particularly suitable for the cleaning operation. To this end, the entire filter packet is after disconnection of the spindle 12 and after removal of cover 11 and the pressure member 36 lifted out of the tank 10 by means of a block and tackle and is deposited at a suitable place. After detaching and removing the tierods 35, the upper clamping plate 18 is lifted off the packet, cleaned and, as shown in FIG. 3, is turned over by 180° and deposited on the floor. The chamber 35 which is subsequently removed from the filter packet is placed aside following the cleaning operation. Thereupon the screen plate 25 of the uppermost supporting plate 28 is lifted off, cleaned and provided with a new filter layer 30 and is then immediately placed upon the prepared clamping plate 18. The remaining supporting plates 28 and screen plates 25 of the filter packet are also cleaned and provided with a new filter layer and immediately stacked on the clamping plate 18 (FIG. 4). Upon the screen plate 25, which was before associated with the lower clamping plate 17 and which after the completion of the stacking operation forms the uppermost screen plate, there is subsequently placed the chamber 34. The thus reconditioned filter packet is closed by the clamping plate 17 which now forms the uppermost clamping plate. The filter packet secured by means of the tierods 35 is then by means of a block and tackle inserted into the filter tank 10. After insertion of the pressure member 36 into the bore 19 of the upper clamping plate 17 and following the mounting of lid 11 onto tank 10, the filter packet is by means of spindle 12 compressed to such an extent that the filter layers 30 clamped-in between plates 25 and 28 become effective as inner and outer rim seals. The filter is then ready for filtration according to which the cloudy liquid flows from the inlet 14 in the direction of the arrows through openings 29 into the cloudy-liquid receiving chambers 31 formed by the stacked filter packet and also into the upper chamber 34. Thereupon the liquid passes through the filter layers 30 on screen plates 25 and flows in the form of a filtrate through the openings 26 and 33 of the respective filtrate chambers 27 and 32 into the container 19 and from there to the outlet 15.

It is, of course, to be understood that the present invention is, by no means, limited to the particular construction shown in the drawings but also comprises any modifications within the scope of the appended claims.

What I claim is:

1. A tank filter, which includes: a tank having a first end wall with a substantially central inlet connection adapted to be connected with a supply of liquid to be filtered, said first end wall also being provided with an eccentrically located outlet connection for discharging filtered liquid, said tank having a second end wall opposite said first end wall and in axially spaced relationship thereto, adjustable clamping pressure exerting means supported by said second end wall and selectively adjustable in the direction of the longitudinal axis of said tank toward and away from said first end wall, a filter packet removably mounted in said tank in spaced relationship to said end walls and having its periphery together with the adjacent wall portion of said tank define an annular chamber communicating with said outlet connection, said filter packet comprising a plurality of axially aligned filter units, each said unit including a supporting plate having an axial passage therethrough in substantially axial alignment with said inlet connection and in fluid communication therewith and also including a screen plate with a filter layer thereon having an axial passage therethrough in axial alignment with the axial passage of the respective adjacent supporting plate, the said aligned axial passages forming a central inlet chamber, one side of each said supporting plate defining with the respective adjacent screen plate and filter layer a first chamber having an inner peripheral bore communicating with the said central inlet chamber while the other side of the same supporting plate defines with its respective screen plate and filter layer a second chamber having an outer peripheral bore communicating with said annular chamber, and two clamping plates respectively interposed between each end of said filter packet and the respective adjacent end wall of said tank and operable in response to the actuation of said clamping means to clamp said filter packet between said clamping plates, said two clamping plates being substantially identical to each other as to height, diameter, and shape and being arranged as an image to each other, in the clamping of the filter packet, each of said clamping plates having a central bore in substantially axial alignment with said central inlet chamber, and that one of said clamping plates which is closest to said inlet connection communicating directly therewith, each of said clamping plates having that side thereof which faces said filter packet provided with means constructed to support a screen plate and filter layer of said filter packet and to form a filter chamber with said screen plate and filter layer, and at least that clamping plate which is closest to said inlet connection so supporting a screen plate and filter layer of said filter packet to form said filter chamber, each of said clamping plates being provided with an outer peripheral bore to communicate said filter chamber and said annular chamber, and blocking means provided to prevent flow through the central bore of the clamping plate adjacent said second end wall.

2. A tank filter according to claim 1, in which said blocking means includes a dish-shaped closure plate means interposed between that clamping plate which is adjacent said second end wall and the adjacent screen plate and filter layer, said closure means so constructed to define with said adjacent filter layer and said screen plate an upper chamber communicating with said central inlet chamber while preventing communication between said central inlet chamber and the central bore in the adjacent clamping plate so that liquid received by said upper chamber from said central inlet chamber can pass into and through the adjacent second chamber of said filter packet and into said annular chamber.

3. A tank filter according to claim 1, which includes a pressure member interposed between said clamping pressure exerting means and the adjacent clamping plate for conveying clamping pressure from said clamping pressure exerting means onto said last mentioned clamping plate.

4. A tank filter according to claim 3, in which said pressure member partially extends into the central bore of the adjacent clamping plate, and in which said clamping pressure exerting means includes a spindle engaging said pressure member.

References Cited

UNITED STATES PATENTS

| | | | |
|---|---|---|---|
| 627,675 | 6/1899 | Zwietusch et al. | 210—344 |
| 2,278,453 | 4/1942 | Kracklauer | 210—344 X |
| 3,306,459 | 2/1967 | Bush | 210—345 X |

FOREIGN PATENTS 299,357  8/1954  Switzerland.

SAMIH N. ZAHARNA, *Primary Examiner.*

REUBEN FRIEDMAN, *Examiner.*

W. S. BRADBURY, *Assistant Examiner.*